June 14, 1932. A. PARKER 1,862,939
AEROPLANE SAFETY WING CONSTRUCTION
Filed May 31, 1930 6 Sheets-Sheet 1

Inventor
Allen Parker
By Miller & Miller
Attorney

Patented June 14, 1932

1,862,939

UNITED STATES PATENT OFFICE

ALLEN PARKER, OF WATERLOO, NEW YORK

AEROPLANE SAFETY WING CONSTRUCTION

Application filed May 31, 1930. Serial No. 458,128.

This invention relates to safety devices for aeroplanes and more particularly to devices adapted to be applied to the wing structure thereof.

The primary object of this invention is to provide at the front portion of the main wings of an aeroplane an auxiliary wing and an adjustable aerofoil or a movable leading edge, both constituting an integral part thereof; and at the rear of said main wings, a plurality of flight stabilizers, and means interconnecting the auxiliary wings, adjustable aerofoils and flight stabilizers, to be directly actuated by the pilot of the plane for controlling the action of the aeroplane under certain conditions of flight, as for example in a nose dive or tail spin.

Another object of this invention is to so design the auxiliary wings, adjustable aerofoils, and flight stabilizers, and the actuating mechanism therefore in such a manner, as to be simple in operation, light in weight, possessing the utmost in strength and efficiency, foolproof, positive in action, and under the direct control of the pilot at all times.

Other objects of this invention will become apparent as the description thereof given hereinunder proceeds, reference being had to the accompanying drawings wherein like reference numerals indicate like parts throughout the same.

Figure 8 is a partial plan view of the main wing proper with parts broken away.

Figure 10 is a longitudinal sectional view through the fuselage of the plane showing the controlling mechanism.

Figure 12$^a$ is a diagrammatic view of the lower wing assembly showing the stabilizer control connections.

Figure 13 is a diagrammatic view of the stick control for the ailerons.

Figures 1, 4:
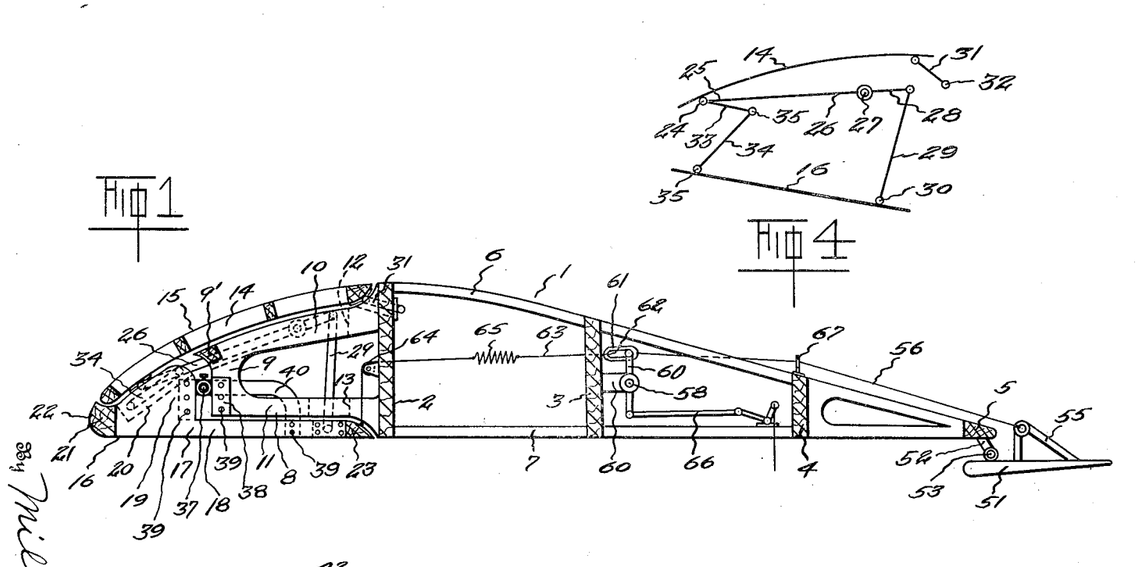
Figure 1 is a cross-sectional view of the main wing embodying the elements of the invention.
Figure 4 is a diagrammatic view of the linkage designed to actuate the auxiliary wing and adjustable aerofoil.

Referring to Figure 1, the reference numeral 1 denotes a main wing of an aeroplane of conventional shape and comprising transverse spars 2, 3, 4 and 5, and longitudinal ribs 6 and 7.

Figure 5:
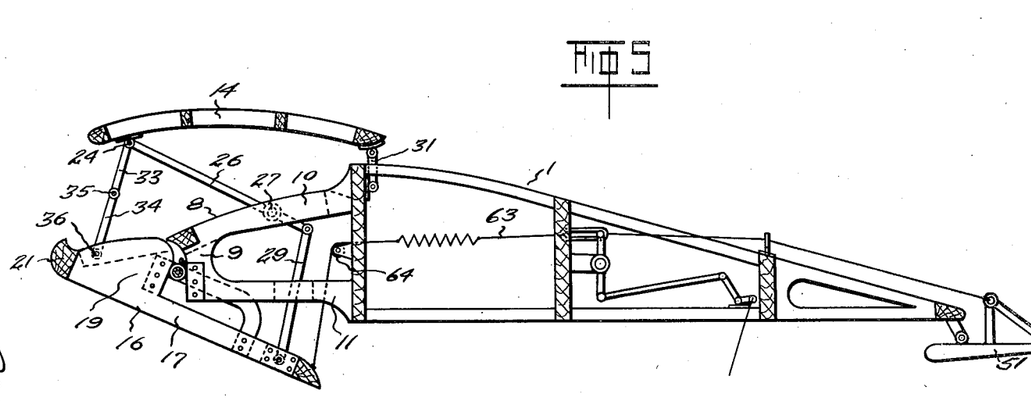
Figure 5 is a cross-sectional view of the main wing, similar to Figure 1, showing the same in operative position.

Rigidly attached to the front spar 2 are a plurality of spaced U-shaped rib members 8, the bight or connecting portion 9 of the legs 10 and 11 thereof, being spaced from the front spar 2 and substantially parallel thereto, as clearly shown in Figures 1 and 5. As will be noted from an inspection of Figure 8, the U-ribs 8 are spaced between the end longitudinal ribs 6$^a$ and 6$^b$, which as is apparent are located adjacent the outer and inner ends, respectively of the main wing proper. Formed in the upper leg 10 of the U-rib 8 is a slot 12 which extends substantially the full length thereof, and in the leg 11 adjacent the inner extremity thereof is a short slot 13, the purpose of said slots to be hereinafter described. Connecting the upper front ends of said U-ribs is a cross-member or spar 9'.

Positioned over the top legs 10 of the U-ribs 8 is an auxiliary wing 14 constructed in any suitable manner and of such a curvature from front to rear that the top surface 15 thereof will merge with the curvature of the top of the main wing 1, the curvature of the whole conforming to aerodynamic principles. The forward end of the auxiliary wing 14 extends for a substantial distance beyond the outer end 9 of the U-rib 8, the end thereof terminating in the plane of the lower leg 11 of said U-rib, which as will be noted is parallel to and spaced a short distance above the plane of the bottom of the main wing 1.

Fitted beneath the auxiliary wing 14 is an adjustable aerofoil 16, built up of spaced L- shaped ribs 17, the horizontal legs 18 of which are adapted to extend beneath and parallel to the lower legs 11 of the U-ribs 8. The vertical legs 19 of the L-ribs 17 are spaced from the bight portion 9 of the U-ribs 8 and are parallel thereto, the top edges thereof being provided with slots 20. Secured to the front ends of the L-ribs is a spar 21 provided with a curved edge 22 which smoothly merges the curvature of the top 15 of the auxiliary wing 14 to the bottom of the adjustable aerofoil 16 and main wing 1 as clearly illustrated in Figure 1, and similarly connecting the rear ends of the L-ribs is a spar 23. It is to be understood that the auxiliary wing 14, adjustable aerofoil 16, and main wing 1 are provided with a suitable covering in the manner well known in the art. It is to be further noted that the auxiliary wing 14 and adjustable aerofoil 16 are exactly of the same length, extending from the ribs 6ª and 6ᵇ, see Figure 8.

Operatively securing the auxiliary wing 14 and adjustable aerofoil 16 to the main wing 1 is a linkage diagrammatically shown in Figure 4. Pivotally attached to the bottom of the auxiliary wing 14 adjacent the outer end thereof as at 24 is one end 25 of a long lever 26, which is fulcrumed as at 27 adjacent its other end 28, within the slot 12 in the upper leg 10 of the U-rib 8. The end 28 of the lever 26 is pivotally connected by means of a link 29 to the inner end of the adjustable aerofoil 16 as at 30. Similarly attached to the other end of the auxiliary wing 14 is one end of a short link 31, the other end of which is pivotally secured to the spar 2 as at 32. Positioned in the slot 20 in the L-rib 17 is a folding linkage comprising a short upper link 33 and a longer lower link 34, pivotally connected together as at 35. The other end of the link 33 is pivotally secured to the auxiliary wing as at 24, while the other end of the link 34 is pivotally secured to the adjustable aerofoil 16 within the slot 20 as at 35. It is to be noted that there are as many sets of linkages such as illustrated in Figure 4 as there are U-ribs and L-ribs.

Figure 3:
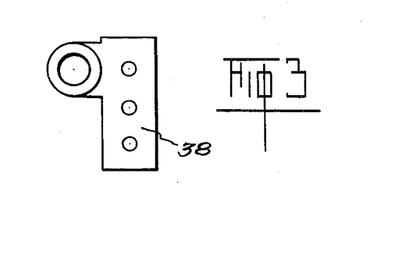

Rotatably mounted in bearings 36 fastened to the main wing ribs 6ª and 6ᵇ (Figure 8) is a tubular hinge member 37 which extends between the vertical leg 19 of the L-rib 17 and the bight portion 9 of the U-rib 8, (Figure 1). The hinge member 37 is rotatably supported by means of hinge brackets 38 (Figure 3) which are secured to the U-ribs 8 by means of rivets 39.

Figure 2:
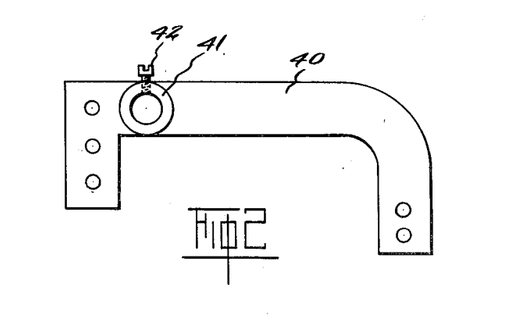
Figures 2 and 3 are detail views of certain connecting members shown in Figure 1.

Secured in a like manner to the L-ribs 17 of the adjustable aerofoil 16 is an inverted C-bracket 40 (Figure 2) having a hub portion 41 provided with a set-screw 42, said hub portion 41 being adapted to fit over the tubular hinge member 37 and to be rigidly secured thereto by means of the set screw 42 in the manner readily apparent, so that movement of the hinge member 37 in the manner to be hereinafter described will impart a similar movement to the adjustable aerofoil 16.

Figure 6:
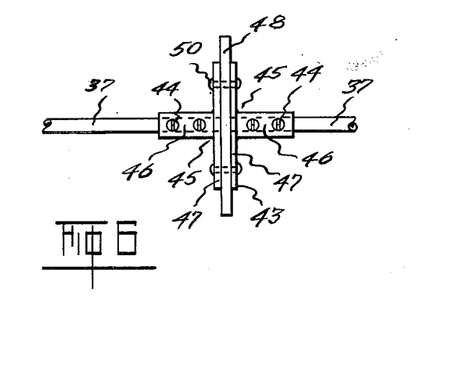
Figures 6 and 7 are detail views of the rocker arm to be described in detail hereinunder.
Figure 7:
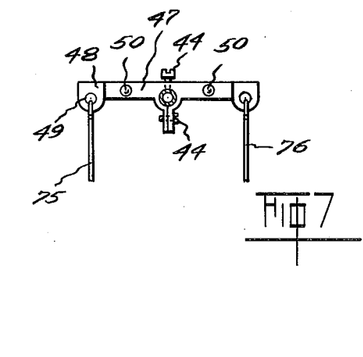

Operatively and rigidly connecting the abutting ends of the hinge members 37 of each of the main wings 1 is a rocker arm 43, specifically shown in Figures 6 and 7. Clamped to each of the abutting ends of the hinge members 37 by means of screws 44 is a bracket 45 comprising a split hub 46 and a flange 47. Positioned between the flanges 47 is an arm 48 having perforated terminals 49, said arm being attached to said flanges by means of rivets 50. Attention is directed to Figure 8 wherein the position of the rocker arm 43 is shown relative to the rest of the wing structure.

Figure 9:
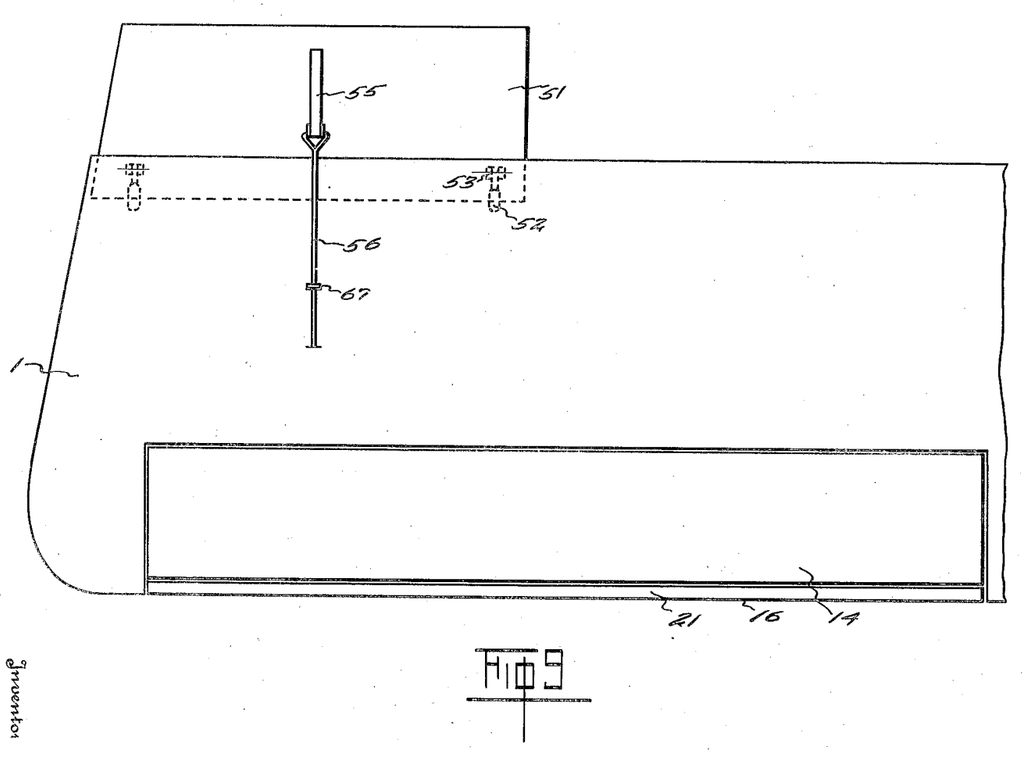
Figure 9 is a plan view of the main wing in its entirety.

Pivotally suspended at the rear ends of the main wing 1 at the bottom of the same are a pair of ailerons 51, which are attached to the brackets 52 carried by the spar 5 by means of the pivots 53. While only one aileron is shown on the portion of the wing shown in Figure 9, it is to be understood that the other aileron is similarly attached to the other end of the wing (not shown). Midway between the brackets 52, and rigidly secured to the top of each aileron 51 is a control bracket 55, which has attached thereto, respectively, one end of a cable or rod 56, the other end of which is attached to lever arms 57 pivotally attached to the wing.

Slidably mounted on anti-friction bearings 58 attached to the longitudinal ribs of the main wing 1 is a tubular control rod 59 which extends substantially the full length of the main wing 1. Connecting the lever arms 57 with the ends of said control rod 59 is a linkage 60 of a somewhat modified form from that shown in Figures 1 and 5. The free end of the lever arm 57 is slidably mounted in a slotted connecting member 61, which has attached thereto as at 62 one end of cable 63, the other end of which passes over a pulley 64 fastened to the spar 2, Figure 1, and is connected to the inner end of the aerofoil 16, as for example, on the spar 23 thereof. A tension spring 65 is inserted in the control cable 63 which is adapted to maintain the ailerons 51 in their neutral position, and to bring them back to said position regardless of whatever position they, the ailerons, might be when the safety device at the front or leading edge of the main wing is opened full.

The ailerons 51 are directly controlled by the common stick in the manner described hereunder by the linkage 60 described above or by a modified form of linkage 66 shown in Figures 1 and 5, the same being more or less of conventional design.

Eyes 67, attached to the top of the main wing 1 are provided to guide the cables 56, and to prevent fouling of the same on the wing.

Figures 10, 12A, 13:
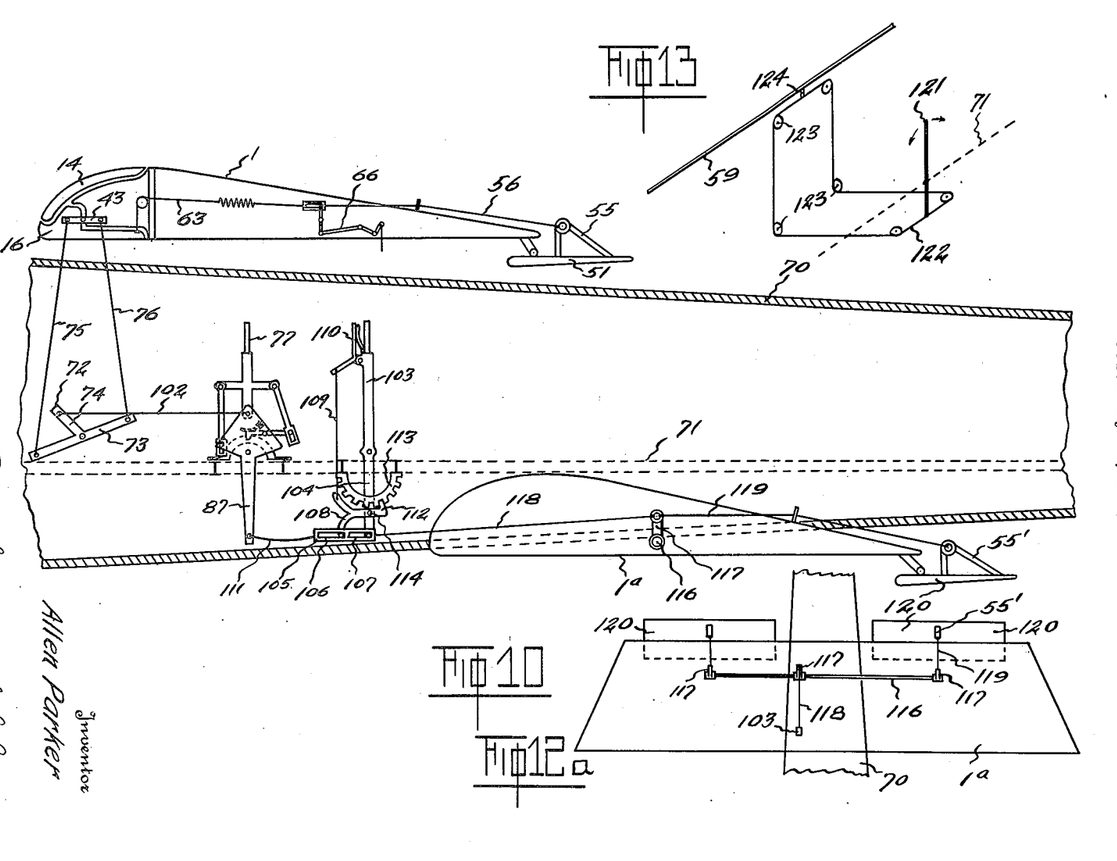

Figure 10 shows a biplane having an upper main wing 1 and a lower main wing 1ª, positioned relative to each other in the conventional manner shown. The fuselage is denoted by the reference numeral 70 and is provided with a floor 71 shown in dotted lines. Directly beneath the rocker arm 43 in the main wing 1 and pivotally mounted on the floor 71 of the fuselage 70 is a double bell crank lever 72, comprising a long arm 73 and a short arm 74. Cables 75 and 76, connect respective ends of the rocker arm 43 and double bell crank lever 72.

Figures 11, 12:
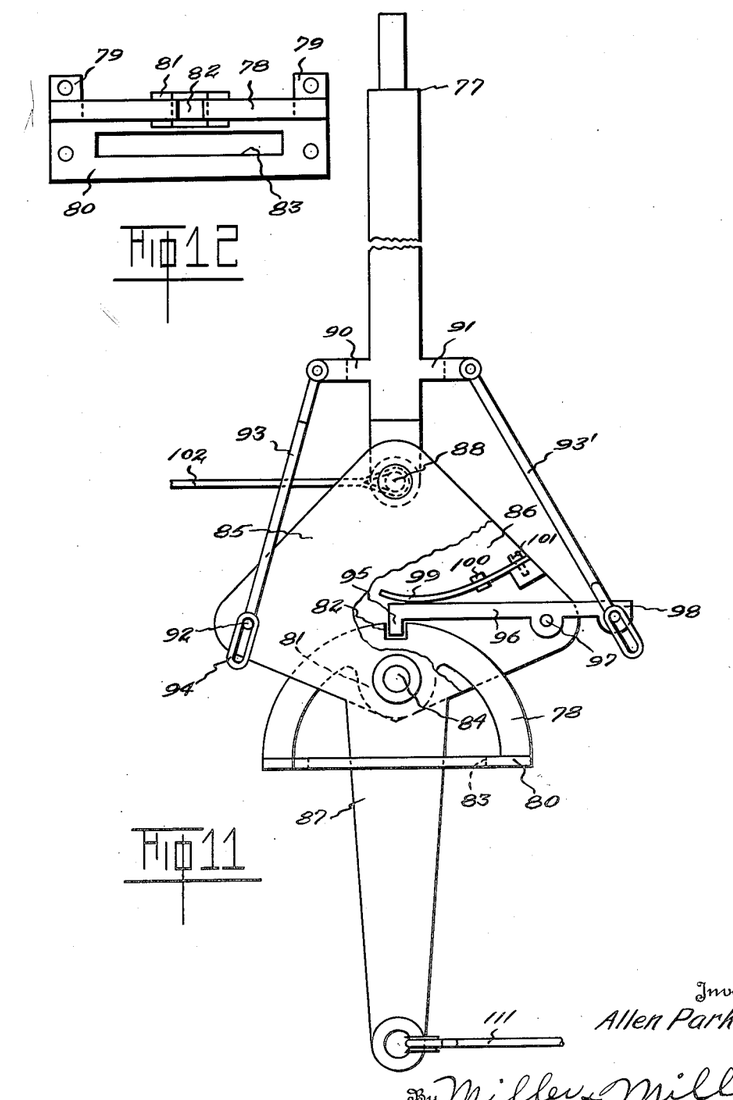
Figure 11 is an enlarged elevational view of the main control lever with parts broken away.
Figure 12 is a detail view of Figure 11.

Directly to the rear of the double bell crank lever 72 is a main control or automatic locking and unlocking lever 77, shown in Figure 10 and in detail in Figures 11 and 12. The main control lever mechanism comprises a semicircular support 78 provided with flanges 79 and 80 for attachment to the floor of the plane. Formed on the support 78 is a hub 81 and in the top of said support directly above the hub 81 is a groove 82. An elongated slot 83 is provided in the flange 80 of the support 78 for a purpose to be hereinafter described. Pivotally mounted on each side of the support 78 by means of the pivot 84 are side plates 85 and 86, the side plate 85 being further provided with a downwardly depending arm 87 which extends through the slot 83 in the support 78, (Figure 11). The upper ends of the spaced plates 85 and 86 have pivotally supported therebetween as at 88, the control lever 89 which is provided near its bottom with integral bifurcated arms 90 and 91. Connecting the end of the arm 90 to the lugs 92 on the side plates 85 and 86 is a bifurcated link 93, provided at its bottom with a pair of slotted eyes 94 adapted to slidably engage the lugs 92. Fitted in the groove 82 in the support 78 is the depending pawl 95 of a locking lever 96 which is fulcrumed intermediate its ends between the side plates 85 and 86 as at 97. The other end 98 of the locking lever 96 is connected to the arm 91 of the control lever 77 by a link 93' similar to the link 93. To maintain the pawl 95 in locked engagement with the groove 82 in the support 78 a leaf spring 99 is provided between the side plates 85 and 86 and adapted to at all times bear against the top of the locking lever 96. The leaf spring 99 extends between lugs 100 on the side plate 86 and is rigidly secured to said side plate by means of the screw 101. Connecting the arm 74 of the double bell crank lever 72 and the pivot 88 on the control lever 77 is a rod or cable 102. It is apparent that movement of the control lever 77 directly actuates the rocking arm 43 (Figure 10) to cause the auxiliary wing 14 and adjustable aerofoil 16 to move to their operative position.

Adjacent the control lever 77 is an auxiliary aileron control lever 103 which is attached to the floor of the plane 71 and is provided with a depending arm 104. Slidably attached to the end of the arm 104 is a plate 105 provided with aligned slots 106 and 107, the slot 107 engaging the end of the arm 104. Positioned in the other slot 106 is one end of a Y-locking lever 108, the other end of the Y-lever being connected by means of the cable 109 to the spring controlled handle 110. A cable 111 connects the slotted plate 105, to the bottom end of the depending arm 87 of the control lever 77. The rear end of the Y-lever 108 is provided with an upright pawl 112 which engages a stationary ratchet 113, said Y-lever 108 being fulcrumed to the depending arm 104 intermediate its ends as at 114.

Positioned in the lower main wing 1ª (Figure 12) is a hinge rod 116 provided with arms 117 similar to that illustrated in Figure 8.

A cable or rod 118 connects the bottom of the arm 104 to the center arm 117 on the hinge rod 116, and a similar pair of cables or rods 119 connect the end arms 117 to the bracket 55' on the stabilizers 120, there being one of each attached to the rear of the lower wing as shown in Figure 12ª, in a manner identical with the attaching means for mounting the ailerons on the main wing 1.

The ailerons 51 are controlled in a conventional manner by means of the common stick 121, Figure 13, mounted in the well known manner in the fuselage. The stick 121 is pivotally mounted adjacent the floor 71 and is adapted for side wise movement. The lower end of the stick 121 is attached to a cable system 122 which is mounted on a plurality of pulleys 123. The cable 122 is secured as at 124 to the aileron control rod 59. Movement of the common stick will cause the control rod 59 to slide either to the right or left to operate the ailerons in the well known manner, i. e., one aileron up while the other goes down, and vice versa.

When an aeroplane equipped with wings embodying the structural features of the invention goes into a nose dive or tail spin, the aeroplane may be righted to a level keel by merely pulling the control lever 77 backward thereby opening or moving up the auxiliary wing 14, adjustable aerofoil 16 and ailerons 51 into their respective operative positions shown clearly in Figure 5, which when in such a position reverse the flow of air around said wing. The adjusted open portion of the front edge of the wing takes the pressure of the air directly on the entire surface of that open part, i. e., the bottom of the adjustable aerofoil 16, thereby creating a vacuum directly in the rear of said aerofoil and on the underside of the main wing section 1. The auxiliary wing 14 when opened simultaneously with the adjustable aerofoil 16 has an air resistance equal to the adjustable aerofoil thus making them air balanced and easily adjusted at any speed. The current of air which is forced out under the trailing edge of the auxiliary wing 14 is forced against the upper surface of the main wing section 1 which causes the same to become an air lever with a tendency to pull downward on the trailing edge and to lift up on the leading edge.

The stabilizers 120 are operated simultaneously either up or down, by movement of the auxiliary lever 103 to properly balance the aeroplane in flight and to take care of varying loads in cabin or baggage space in the manner well known in the art. The stabilizers will take the air resistance over the entire upper surface thereof causing a hard downward pull on the wing. The force reactions as above mentioned will right the plane to a level keel from any dangerous position.

It is to be understood that the principles of this invention may be applied to either a monoplane or any multi-wing aeroplane and may be modified within the scope of the appended claims.

Having thus described my invention, what I claim as new and desire to secure by Letters Patent is:—

1. An aeroplane wing comprising a main wing section, an auxiliary wing positioned at the upper forward end thereof, an adjustable aerofoil beneath said auxiliary wing, and an aileron positioned at the rear of said main wing and pivotally secured thereto, said auxiliary wing and adjustable aerofoil when in normal position being flush with the outer surface contour of the main wing to permit uninterrupted flow of air currents thereover, said aileron being substantially parallel to the bottom of said main wing when in normal position, link and lever means operatively connecting said auxiliary wing and adjustable aerofoil to said main wing section, a connection between said adjustable aerofoil and said aileron, and manually operated means for controlling and actuating the above connecting means to move said adjustable aerofoil, auxiliary wing and aileron into operative position.

2. An aeroplane wing comprising a main wing section, an auxiliary wing positioned at the upper forward end thereof, an adjustable aerofoil beneath said auixliary wing, and an aileron positioned at the rear of said main wing and pivotally secured thereto, said auxiliary wing and adjustable aerofoil when in normal position being flush with the outer surface contour of the main wing to permit uninterrupted flow of air currents thereover, said aileron being substantially parallel to the bottom of said main wing when in normal position, link and lever means operatively connecting said auxiliary wing and adjustable aerofoil to said main wing section, a flexible and resilient connection between said adjustable aerofoil and said aileron, and manually operated means for controlling and actuating the above connecting means to move said adjustable areofoil, auxiliary wing and aileron into operative position.

3. An aeroplane wing comprising a main wing section built up of transverse spars and longitudinal ribs, a plurality of spaced U-ribs having the legs thereof rigidly secured to the foremost front spar of said main wing, longitudinal slots in the top leg of each U-rib, cross members connecting the upper front ends of said U-ribs, a curved auxiliary wing positioned over said U-ribs and extending beyond the front ends thereof, the front edge of said auxiliary wing terminating substantially in the plane of the lower leg of said U-ribs, an adjustable aerofoil beneath said auxiliary wing, said aerofoil comprising a plurality of spaced L-ribs in alignment with said U-ribs and positioned thereunder, the vertical legs of said L-ribs being spaced from and parallel to the bight portion of said U-ribs and the horizontal leg of said L-ribs being spaced from and parallel to the lower legs of said U-ribs, a slot in the top portion of each of the vertical legs of said L-ribs, and a transverse cross member having a curved front edge connected to said L-ribs and constituting the movable leading edge of said aerofoil.

4. The structure specified in claim 3, bearings on the end longitudinal spars of the main wing, hinge brackets rigidly secured to the bight portion of said U-ribs, a tubular hinge member rotatably mounted in said bearings and hinge brackets, and positioned between the vertical leg of said L-ribs and the bight portion of said U-ribs, and an inverted C-bracket rigidly connected intermediate its ends to said hinge member and the legs thereof rigidly attached respectively to the legs of the L-ribs, whereby said adjustable aerofoil is adapted to swing about the axis of said hinge member as a center.

5. The structure specified in claim 3, a plurality of short links pivotally connecting the rear end of the auxiliary wing to the forward spar of the main wing, a plurality of long levers pivotally connected at their forward ends to the front end of said auxiliary wing and fulcrumed at a point adjacent their rear ends in the slots in the upper legs of the U-ribs, a plurality of links pivotally connecting said rear ends of said levers to the rear end of said adjustable aerofoil, and a plurality of folding linkages positioned in the slots in the vertical legs of said L-ribs, the free ends of which are respectively pivotally attached to the front end of said auxiliary wing and the front end of said adjustable aerofoil.

6. An aeroplane wing comprising a main wing section, an auxiliary wing positioned at the upper forward end thereof, an adjustable aerofoil beneath said auxiliary wing, and an aileron positioned at the rear of said main wing and pivotally secured thereto, said auxiliary wing and adjustable aerofoil when in normal position being flush with the outer surface contour of the main wing to permit uninterrupted flow of air currents thereover, and said aileron being substantially parallel to the bottom of said main wing when in normal position, link and lever means operatively connecting said auxiliary wing and adjustable aerofoil to said main wing section, a flexible and resilient connection between said adjustable aerofoil and said aileron, and manually operated means for controlling and actuating the above connecting means to move said adjustable aerofoil, auxiliary wing and aileron into operative position, and a hinge member rotatably supported by said main wing, means to rigidly connect said adjustable aerofoil to said hinge member, and a rocking arm on said hinge member operatively connected to said manually operated means.

7. The structure specified in claim 6, and auxiliary manually operated means for controlling said ailerons independent of said auxiliary wing and said adjustable aerofoil.

8. The structure specified in claim 6, said flexible and resilient means comprising a pulley supported by the main wing section, a control rod slidably mounted in the interior of said main wing, lever arms pivotally mounted in said wing, a slotted plate slidably mounted on one end of said lever arms, a cable connected at one end to said plate, the other end thereof passing over said pulley and attached to the rear end of said adjustable aerofoil, and cables connecting said arms to said ailerons, and a linkage connecting the ends of said control rod to said lever arms.

In testimony whereof I affix my signature.

ALLEN PARKER.